United States Patent
Detmer et al.

(10) Patent No.: US 12,321,709 B1
(45) Date of Patent: Jun. 3, 2025

(54) EFFICIENT CACHING AND RETRIEVAL OF RESPONSES IN CONVERSATION SERVICE APPLICATION COMMUNICATION SESSIONS

(71) Applicant: FMR LLC, Boston, MA (US)

(72) Inventors: Allen Detmer, Patriot, IN (US); Naveen Rajamoorthy, Mason, OH (US); Niranjan Vasan, Mason, OH (US); Elio Dante Querze, III, Arlington, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/034,853

(22) Filed: Jan. 23, 2025

(51) Int. Cl.
*G06F 40/40* (2020.01)
*G06F 16/31* (2019.01)
*G06F 18/2413* (2023.01)
*G06F 40/284* (2020.01)

(52) U.S. Cl.
CPC ............ *G06F 40/40* (2020.01); *G06F 16/328* (2019.01); *G06F 18/24147* (2023.01); *G06F 40/284* (2020.01)

(58) Field of Classification Search
CPC .. G06F 40/40; G06F 16/328; G06F 18/24147; G06F 40/284
USPC .......................................................... 704/9
See application file for complete search history.

(56) References Cited

U.S. PATENT DOCUMENTS

| | | |
|---|---|---|
| 6,446,120 B1 | 9/2002 | Dantressangle |
| 7,228,278 B2 | 6/2007 | Nguyen et al. |
| 7,360,025 B1 | 4/2008 | O'Connell et al. |
| 7,412,260 B2 | 8/2008 | Gailey et al. |
| 8,630,961 B2 | 1/2014 | Beilby et al. |
| 9,172,747 B2 | 10/2015 | Walters et al. |
| 9,318,108 B2 | 4/2016 | Gruber et al. |
| 9,767,794 B2 | 9/2017 | Vibbert et al. |
| 10,109,297 B2 | 10/2018 | Brown et al. |
| 10,127,224 B2 | 11/2018 | DeLeeuw |
| 10,313,404 B2 | 6/2019 | Ein-Gil et al. |

(Continued)

FOREIGN PATENT DOCUMENTS

CN    113987107 A    1/2022

OTHER PUBLICATIONS

"Gathering information with slots," IBM Cloud Docs /Watson Assistant (Managed), retrieved from https://cloud.ibm.com/docs/assistant?topics=assistant-dialog-slots on Feb. 16, 2021, 12 pages.

(Continued)

*Primary Examiner* — Thierry L Pham
(74) *Attorney, Agent, or Firm* — Cesari and McKenna, LLP (57) ABSTRACT

Methods and systems for efficient caching and retrieval of responses in conversation service applications includes a server that captures an utterance and converts the utterance into an utterance index key. The server searches a first response cache to determine whether the utterance index key matches a response index key. When there is a match, the server transmits a response that matches the utterance index key to a client device. When there is not a match, the server converts the utterance into an utterance embedding and searches a second response cache to identify a response embedding. The server captures a fuzzy response index key associated with the closest matching response embedding and searches the first response cache to identify a response index key that matches the fuzzy response index key.

26 Claims, 6 Drawing Sheets

(56) References Cited

U.S. PATENT DOCUMENTS

| | | |
|---|---|---|
| 10,452,695 B2 | 10/2019 | Rodgers |
| 10,453,454 B2 | 10/2019 | Homma et al. |
| 10,650,817 B2 | 5/2020 | Choi et al. |
| 10,795,640 B1 | 10/2020 | Knight et al. |
| 10,839,167 B2 | 11/2020 | Mahajan et al. |
| 10,902,533 B2 | 1/2021 | McConnell et al. |
| 10,984,784 B2 | 4/2021 | Kuczmarski et al. |
| 11,134,152 B2 | 9/2021 | McGann et al. |
| 11,196,863 B2 | 12/2021 | Spohrer |
| 11,379,446 B1 | 7/2022 | Detmer et al. |
| 11,463,387 B1 | 10/2022 | Panati et al. |
| 11,468,282 B2 | 10/2022 | Sanghavi et al. |
| 11,609,941 B2 | 3/2023 | Folland et al. |
| 11,646,022 B2 | 5/2023 | Kang et al. |
| 11,734,089 B2 | 8/2023 | Detmer |
| 11,741,529 B2 | 8/2023 | Siefken et al. |
| 11,748,437 B2 | 9/2023 | Michalski et al. |
| 11,763,097 B1 | 9/2023 | Thomas et al. |
| 11,777,875 B2 | 10/2023 | Uppala et al. |
| 11,966,705 B2 | 4/2024 | Detmer et al. |
| 2002/0032591 A1 | 3/2002 | Mahaffy et al. |
| 2003/0132958 A1 | 7/2003 | Himmel et al. |
| 2004/0218751 A1 | 11/2004 | Colson et al. |
| 2012/0041903 A1 | 2/2012 | Beilby et al. |
| 2014/0279050 A1 | 9/2014 | Makar et al. |
| 2016/0042735 A1 | 2/2016 | Vibbert et al. |
| 2016/0094492 A1 | 3/2016 | Li et al. |
| 2017/0148073 A1 | 5/2017 | Nomula et al. |
| 2017/0324867 A1 | 11/2017 | Tamblyn et al. |
| 2018/0131643 A1 | 5/2018 | Trufinescu et al. |
| 2018/0293983 A1 | 10/2018 | Choi et al. |
| 2018/0337872 A1 | 11/2018 | Fawcett |
| 2019/0089655 A1 | 3/2019 | Uppala et al. |
| 2019/0095524 A1 | 3/2019 | Rodgers |
| 2019/0180258 A1 | 6/2019 | Amar et al. |
| 2019/0188590 A1 | 6/2019 | Wu et al. |
| 2019/0258456 A1 | 8/2019 | Byun et al. |
| 2019/0311036 A1 | 10/2019 | Shanmugam et al. |
| 2019/0311713 A1 | 10/2019 | Talwar et al. |
| 2020/0005118 A1 | 1/2020 | Chen et al. |
| 2020/0007380 A1 | 1/2020 | Chen et al. |
| 2020/0081939 A1 | 3/2020 | Subramaniam |
| 2020/0126540 A1 | 4/2020 | Panchamgam et al. |
| 2020/0175118 A1 | 6/2020 | Mahajan et al. |
| 2020/0273089 A1 | 8/2020 | Siefken et al. |
| 2020/0320984 A1 | 10/2020 | Kuczmarski et al. |
| 2020/0364300 A1 | 11/2020 | Tan et al. |
| 2021/0004390 A1 | 1/2021 | Li et al. |
| 2021/0035576 A1 | 2/2021 | Kang et al. |
| 2021/0142009 A1 | 5/2021 | Detmer et al. |
| 2021/0312904 A1 | 10/2021 | Shukla et al. |
| 2022/0059093 A1 | 2/2022 | Cotting et al. |
| 2024/0195776 A1 | 6/2024 | Detmer et al. |
| 2024/0257142 A1 | 8/2024 | Thomas et al. |
| 2024/0265010 A1 | 8/2024 | Garg et al. |

OTHER PUBLICATIONS

L. Messinger, "How to Build an End-to-End Conversational AI System using Behavior Trees," freeCodeCamp, dated Apr. 12, 2019, available at https://www.freecodecamp.org/news/how-to-build-an-end-to-end-conversational-ai-system-using-behavior-trees-658a7122e794/, 23 pages.

S. Shu et al., "A Behavior Tree Cognitive Assistant System for Emergency Medical Services," 2019 IEEE/RSJ International Conference on Intelligent Robots and Systems (IROS), Macau, China, 2019, pp. 6188-6195, doi: 10.1109/IROS40897.2019.8968233.

W. Gill et al., "MeanCache: User-Centric Semantic Cache for Large Language Model Based Web Services," arXiv:2403.02694v3 [cs.LG], Jul. 15, 2024, available at https://arxiv.org/html/2403.02694v3, 14 pages.

B. Fu and D. Feng, "GPTCache: An Open-Source Semantic Cache for LLM Applications Enabling Faster Answers and Cost Savings," Proceedings of the 3rd Workshop for Natural Language Processing Open Source Software (NLP-OSS 2023), pp. 212-218, Dec. 6, 2023, 7 pages.

J. Li et al., "SCALM: Towards Semantic Caching for Automated Chat Services with Large Language Models," arXiv:2406.00025v1 [cs.CL], May 24, 2024, available at https://arxiv.org/pdf/2406.00025, 10 pages.

S. Singh et al., "LLM-dCache: Improving Tool-Augmented LLMs with GPT-Driven Localized Data Caching," arXiv:2406.06799v1 [cs.DC], Jun. 10, 2024, available at https://arxiv.org/html/2406.06799v1, 4 pages.

D. Lee, "Speed Up LLMs Using a Semantic Cache Layer with SingleStoreDB," blog post at https://www.singlestore.com/blog/speed-up-llms-using-a-semantic-cache-layer-with-singlestoredb/, dated Sep. 8, 2023, accessed Aug. 8, 2024, 8 pages.

N. Reimers and I. Gurevych, "Sentence-BERT: Sentence Embeddings using Siamese BERT-Networks," arXiv:1908.10084v1 [cs.CL], Aug. 27, 2019, available at https://arxiv.org/pdf/1908.10084, 11 pages.

EFFICIENT CACHING AND RETRIEVAL OF RESPONSES IN CONVERSATION SERVICE APPLICATION COMMUNICATION SESSIONS

TECHNICAL FIELD

This application relates generally to methods and apparatuses, including computer program products, for efficient caching and retrieval of responses in conversation service application communication sessions.

BACKGROUND

As computing technology has become commonplace, many organizations have transitioned away from traditional call centers where customer service agents receive telephone calls from customers to answer questions and resolve issues toward software-based electronic communication interfaces such as text-based online chat sessions over the Internet. In order to efficiently manage this form of communication, many organizations are turning to automated conversation service software applications (such as chatbots and virtual assistants (VAs)) as the first line of interaction with end users. These conversation service applications are programmed to automatically parse chat messages received from a user and determine an appropriate response, then generate a response message to the user as part of the conversation flow. In some cases, the conversation service application is able to determine the user's intent relating to a given message or request and use the intent to formulate an appropriate response. Many times, a conversation service software application can resolve the end user's inquiry altogether.

Automated conversational systems are increasingly incorporating calls to large language models (LLMs), natural language processing (NLP) and/or natural language understanding (NLU) models, guardrail models, and machine learning-based intent classification models to improve the quality and naturalness of interactions within a virtual assistant experience. However, several challenges hinder the seamless integration and effective use of artificial intelligence (AI)-based models in virtual assistant systems. For example, when conversational dialogue flows are designed to match a user utterance to an intent and a response, they can incorporate calls to one or more LLMs, NLP/NLU models, or other custom AI response-building models before a final response to the user utterance can be constructed. Moreover, each model call may be accompanied by calls to one or more guardrail models to ensure safety and quality of the response from each of the response-building models.

Thus, a single dialog flow design can orchestrate multiple AI models calls—which significantly increases end user latencies for these dialogues and drastically increases the computational resources needed to execute the dialogues. As a result, this leads to high costs for execution, deployment, and maintenance of virtual assistant applications. The issue is further exacerbated when a single utterance to the virtual assistant application may have to be evaluated through multiple dialogue flows for discovery, chaining, or recovery purposes, before presenting a high-quality valid response to the user.

Some existing systems may have limited functionality to cache responses to user utterances for retrieval during a virtual assistant session, to avoid having to repeatedly call AI models for common responses. However, these caches are often very rudimentary-essentially caching a single response built using a specific AI model and associating the response with one intent or utterance. However, AI models can change rapidly as new model generation algorithms or training processes are developed. In these situations, existing systems will store responses generated using a specific AI model or version that are no longer accurate or relevant to user intents or utterances-leading to user frustration and risk in providing incorrect or harmful information.

SUMMARY

The methods and systems described herein address the above-described drawbacks of existing virtual assistant systems by providing a modular approach to short-circuit, dynamically cache, and efficiently recall both the model execution path traversed during conversational dialogue flow processing and the results from various AI model calls made during such path traversals. The techniques described herein enable a reduction in the amount of AI model calls required for a particular conversation session and/or for a pre-defined time interval by employing a fine-tuned fuzzy caching strategy to maximize cached response hits. As can be appreciated, the technical advantages of the methods and systems include providing the ability to cache information for efficient retrieval during conversation dialogue processing; a short circuit to avoid calling AI models repeatedly when the same utterance or a similar utterance is received again (e.g., in a predefined time interval); enabling faster response times for generation of responses to the user when processing a dialogue; and reducing traffic overhead and cost incurred when calling AI models in a dialogue processing system. In addition, the techniques can provide for reduced load on backend response generation systems including LLMs, classification models, and APIs for dialogue processing workflows; improved facilitation of VA workflow design (particularly in larger workflows); acting as a buffer during peak usage periods, ensuring smooth dialogue processing performance when there is a surge in user activity; and acting as a backup to provide limited dialogue processing functionality when one or more underlying backend is unavailable.

The invention, in one aspect, features a system for efficient caching and retrieval of responses in conversation service application communication sessions. The system includes a server computing device having a memory that stores computer-executable instructions and a processor that executes the computer-executable instructions. The server computing device captures an utterance generated by a user of a client computing device during a conversation service application communication session between the server computing device and the client computing device. The server computing device converts the utterance into an utterance index key. The server computing device searches a first response cache comprising a plurality of response index keys to determine whether the utterance index key matches one of the response index keys. When the utterance index key matches one of the response index keys in the first response cache, the server computing device transmits a response associated with the response index key that matches the utterance index key from the first response cache to the client computing device. When the utterance index key does not match any of the response index keys in the first response cache, the server computing device converts the utterance into an utterance embedding. The server computing device searches a second response cache comprising a plurality of response embeddings to identify one of the response embeddings that is a closest match to the utterance embedding. The server computing device captures a fuzzy response index key associated with the closest matching response embedding in the second response cache. The server computing device searches the first response cache to identify a response index key that matches the fuzzy response index key. The server computing device transmits a response associated with the response index key that matches the fuzzy response index key from the first response cache to the client computing device.

The invention, in another aspect, features a computerized method of efficient caching and retrieval of responses in conversation service application communication sessions. A server computing device captures an utterance generated by a user of a client computing device during a conversation service application communication session between the server computing device and the client computing device. The server computing device converts the utterance into an utterance index key. The server computing device searches a first response cache comprising a plurality of response index keys to determine whether the utterance index key matches one of the response index keys. When the utterance index key matches one of the response index keys in the first response cache, the server computing device transmits a response associated with the response index key that matches the utterance index key from the first response cache to the client computing device. When the utterance index key does not match any of the response index keys in the first response cache, the server computing device converts the utterance into an utterance embedding. The server computing device searches a second response cache comprising a plurality of response embeddings to identify one of the response embeddings that is a closest match to the utterance embedding. The server computing device captures a fuzzy response index key associated with the closest matching response embedding in the second response cache. The server computing device searches the first response cache to identify a response index key that matches the fuzzy response index key. The server computing device transmits a response associated with the response index key that matches the fuzzy response index key from the first response cache to the client computing device.

Any of the above aspects can include one or more of the following features. In some embodiments, converting the utterance into an utterance index key comprises processing the utterance using one or more text pre-processing algorithms. In some embodiments, the one or more text pre-processing algorithms include a tokenization algorithm, a normalization algorithm, a stopword removal algorithm, and a stemming algorithm.

In some embodiments, the utterance embedding comprises a multidimensional vector of numeric values representing features of the utterance. In some embodiments, the server computing device compares the utterance embedding to the plurality of response embeddings in the second response cache using a semantic similarity algorithm to identify one of the response embeddings that is the closest match to the utterance embedding. In some embodiments, the semantic similarity algorithm comprises a k-nearest neighbor algorithm.

In some embodiments, when the fuzzy response index key does not match any of the response index keys in the first response cache, the server computing device creates an input prompt based upon the utterance, transmits the input prompt to a large language model (LLM) for generation of a new response to the utterance, stores the new response in the second response cache in association with the fuzzy response index key, and transmits the new response to the client computing device.

In some embodiments, the server computing device periodically refreshes at least one of the first response cache and the second response cache. In some embodiments, periodically refreshing at least one of the first response cache and the second response cache comprises determining that one or more response generation models used to generate responses stored in the first response cache or the second response cache have changed, identifying, in the first response cache or the second response cache, one or more responses generated using the changed response generation models based upon metadata associated with the responses, and removing the identified responses from the first response cache or the second response cache. In some embodiments, the metadata associated with the responses comprises a model identifier associated with each of the responses. In some embodiments, determining one or more response generation models have changed comprises determining that the one or more response generation models is out of date or determining that a version number of the one or more response generation models has changed.

In some embodiments, periodically refreshing at least one of the first response cache and the second response cache comprises determining that one or more documents used to train one or more response generation models associated with responses stored in the first response cache or the second response cache have changed, identifying, in the first response cache or the second response cache, one or more responses associated with the response generation models trained using changed documents based upon metadata associated with the changed documents, and removing the identified responses from the first response cache or the second response cache. In some embodiments, the one or more response generation models include a large language model, a question-and-answer-model, or a guardrail model.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
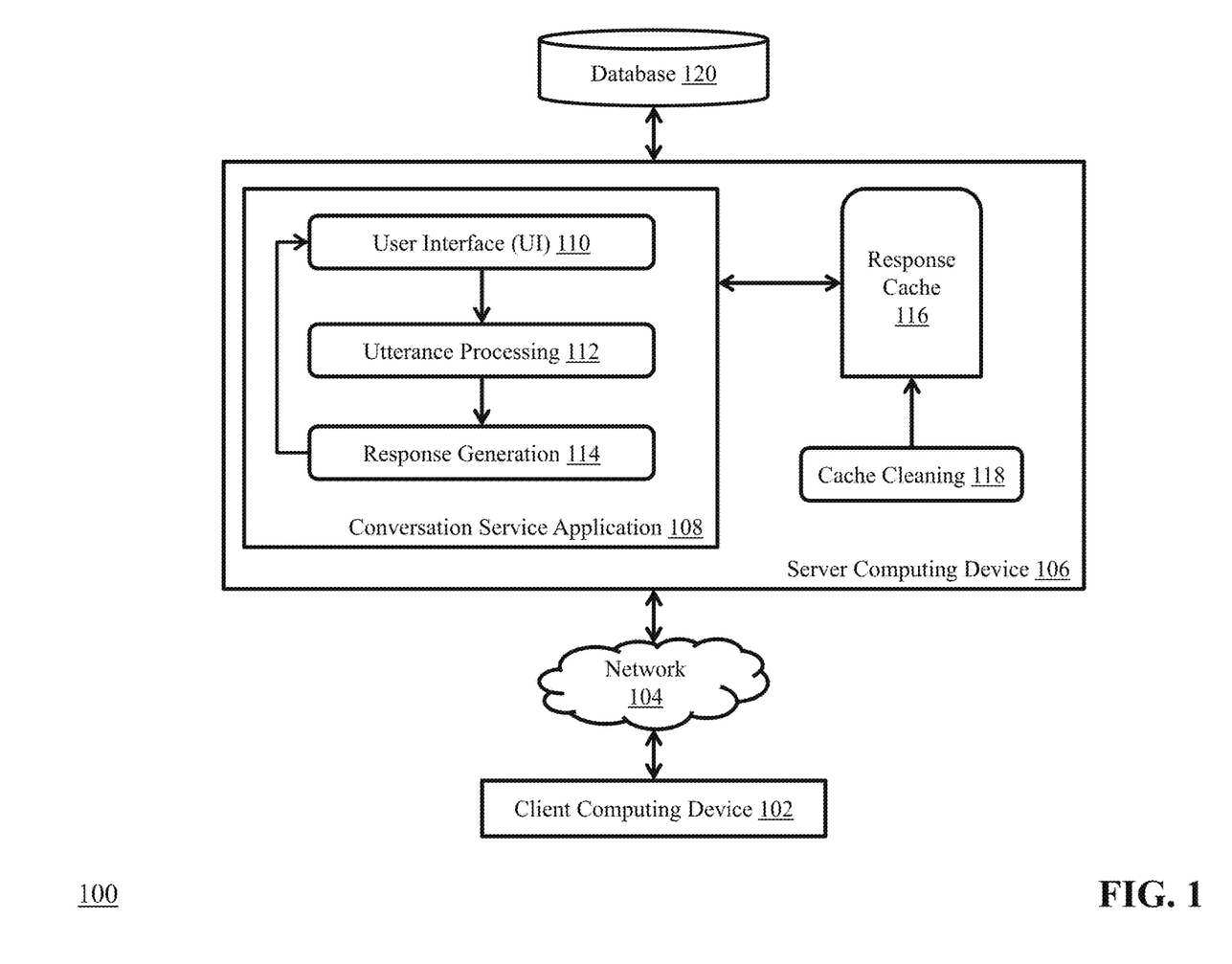
FIG. 1 is a block diagram of a system for efficient caching and retrieval of responses in conversation service application communication sessions.

FIG. 1 is a block diagram of system 100 for efficient caching and retrieval of responses in conversation service application communication sessions. System 100 includes client computing device 102, communications network 104, server computing device 106 that comprises conversation service application 108 with user interface (UI) module 110, utterance processing module 112, and response generation module 114, response cache 116, and cache cleaning module 118. System 100 also includes database 120 coupled to server computing device 106.

Client computing device 102 connects to one or more communications networks (e.g., network 104) in order to communicate with computing device 106 to provide input and receive output relating to one or more chat-based communication sessions as described herein. Exemplary client computing devices 102 include but are not limited to server computing devices, desktop computers, laptop computers, tablets, mobile devices, smartphones, and the like. It should be appreciated that other types of client computing devices that are capable of connecting to the components of the system 100 can be used without departing from the scope of invention. Although FIG. 1 depicts one client computing device 102, it should be appreciated that system 100 can include any number of client computing devices. In some embodiments, client computing device 102 is configured with chat application software, which enables client computing device 102 to establish a chat-based communication session with server computing device 106 via conversation service application 108 of server computing device 106.

Communications network 104 enables client computing device 102 to communicate with server computing device 106. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Server computing device 106 is a device including specialized hardware and/or software modules that execute on one or more processors and interact with memory modules (including but not limited to response cache 116) of server computing device 106, to receive data from other components of system 100, transmit data to other components of system 100, and perform functions for efficient caching and retrieval of responses in conversation service application communication sessions as described herein. Server computing device 106 includes conversation service application 108 that executes on one or more processors of server computing device 106 and includes UI module 110, utterance processing module 112, and response generation module 114. Server computing device 106 also includes cache cleaning module 118, which in some embodiments can be included in conversation service application 108. Also, in some embodiments, modules 110, 112, 114 and 118 are specialized sets of computer software instructions programmed onto one or more dedicated processors in server computing device 106.

As can be appreciated, in some embodiments, conversation service application 108a comprises a software application configured to automatically interact with a user at client computing devices 102a-102n in order to gather information and/or respond to inquiries. For example, conversation service application 108a can be configured as a chatbot, virtual assistant, information retrieval service, or other type of software. An exemplary conversation service application can be based upon a natural language processing (NLP) architecture and/or natural language understanding (NLU) architecture using one or more NLP/NLU services which intelligently parse text messages and/or spoken audio messages (also called utterances) received from client computing devices to understand the context and intent of the message(s) and how to best respond to it. In some embodiments, conversation service application 108a can establish a chat-based communication session with client computing device 102 to enable a user at client computing device 102 to participate in an automated chat session with conversation service application 108. In these embodiments, UI module 110 of application 108 provides a chat interface for the exchange of messages with client computing device 102.

In some embodiments, client computing device 102 includes an application that executes on client computing device 102 to provide certain functionality to an end user. In some embodiments, client computing device 102 can include a native application installed locally on client computing device 102. For example, a native application is a software application (also called an 'app') that written with programmatic code designed to interact with an operating system that is native to client computing device 102 and provide information and application functionality (such as a chatbot interface) to a user of client computing device 102. In the example where client computing device 102 is a mobile device such as a smartphone, the native application software may be available for download from an online repository such as, e.g., the Apple® App Store or the Google® Play Store. In some embodiments, the native application includes a software development kit (SDK) module that is executed by one or more processors of client computing device 102. In other embodiments, client computing device 102 can include a browser application that runs on client computing device 102 and connects to one or more other computing devices (e.g., server computing device 106) for retrieval and display of information and application functionality (such as conducting a chat-based communication session with conversation service application 108). In one example, the browser application enables client computing device 102 to communicate via HTTP or HTTPS with server computing device 106 (e.g., via a URL) to receive website-related content, including one or more webpages, for rendering in the browser application and presentation on a display device coupled to client computing device 102. Exemplary browser application software includes, but is not limited to, Firefox™, Chrome™, Safari™, and other similar software. The one or more webpages can comprise visual and audio content for display to and interaction with a user.

Conversation service application 108 includes a plurality of computing modules—UI module 110, utterance processing module 112, and response generation module 114—that execute on one or more processors of server computing device 106. As mentioned above, conversation service application 108 can include cache cleaning module 118 or alternatively, application 108 can connect to cache cleaning module 118 (e.g., via socket, pipe, command line, etc.) that is executing in a separate application space. In some embodiments, modules 110, 112, 114, 118 are specialized sets of computer software instructions programmed onto one or more dedicated processors in server computing device 106 and can include specifically designated memory locations and/or registers for executing the specialized computer software instructions.

Although modules 110, 112, 114 are shown in FIG. 1 as executing within VA application 108 on server computing device 106, in some embodiments the functionality of modules 110, 112, 114 can be distributed among a plurality of server computing devices. As shown in FIG. 1, server computing device 106 enables modules 110, 112, 114 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 110, 112, 114 and 118 is described in detail throughout the specification.

Response cache 116 is a data store located on server computing device 106 and coupled to conversation service application 108 and cache cleaning module 118. Response cache 118 is configured to store indexed data that can be used by conversation service application 108 during a session with client computing device 102 to generate a response to a user utterance. As can be appreciated, response cache 116 can be configured to store indexed data corresponding to dialogue utterance-response pairs previously captured by system 100 during conversation service sessions. For example, during a prior conversation session, a user at a client computing device may submit an utterance to conversation service application 108, which executes response generation module 114 (as described in FIG. 3 below) to generate a response to the utterance. Then, the utterance-response pair is indexed and stored in response cache 116 for reference and matching during subsequent response generation as will be described in detail throughout the specification. In this context, a 'response' can be an answer to a question posed in the utterance, a message in response to a statement in the utterance, and/or a dialogue state that can be used by conversation service application 108 to reconstruct a dialogue response for the current chat session. As will be described in greater detail below, response cache 116 can include a plurality of separate sub-caches, one of which stores indexed question-answer data and another of which stores indexed embedding data. In some embodiments, response cache 116 is an in-memory data store that provides low latency access to, and high availability of, data stored therein.

Database 120 is a computing device (or set of computing devices) coupled to server computing device 106 and configured to receive, generate, and store specific segments of data relating to the process of efficient caching and retrieval of responses in conversation service application communication sessions as described herein. In some embodiments, system 100 can include a plurality of databases. In some embodiments, the entire database 120 or a portion of database 120 can be integrated with server computing device 106 or be located on a separate computing device or devices. Database 120 can comprise one or more databases configured to store portions of data used by the other components of system 100, as described throughout the specification.

Figure 2:
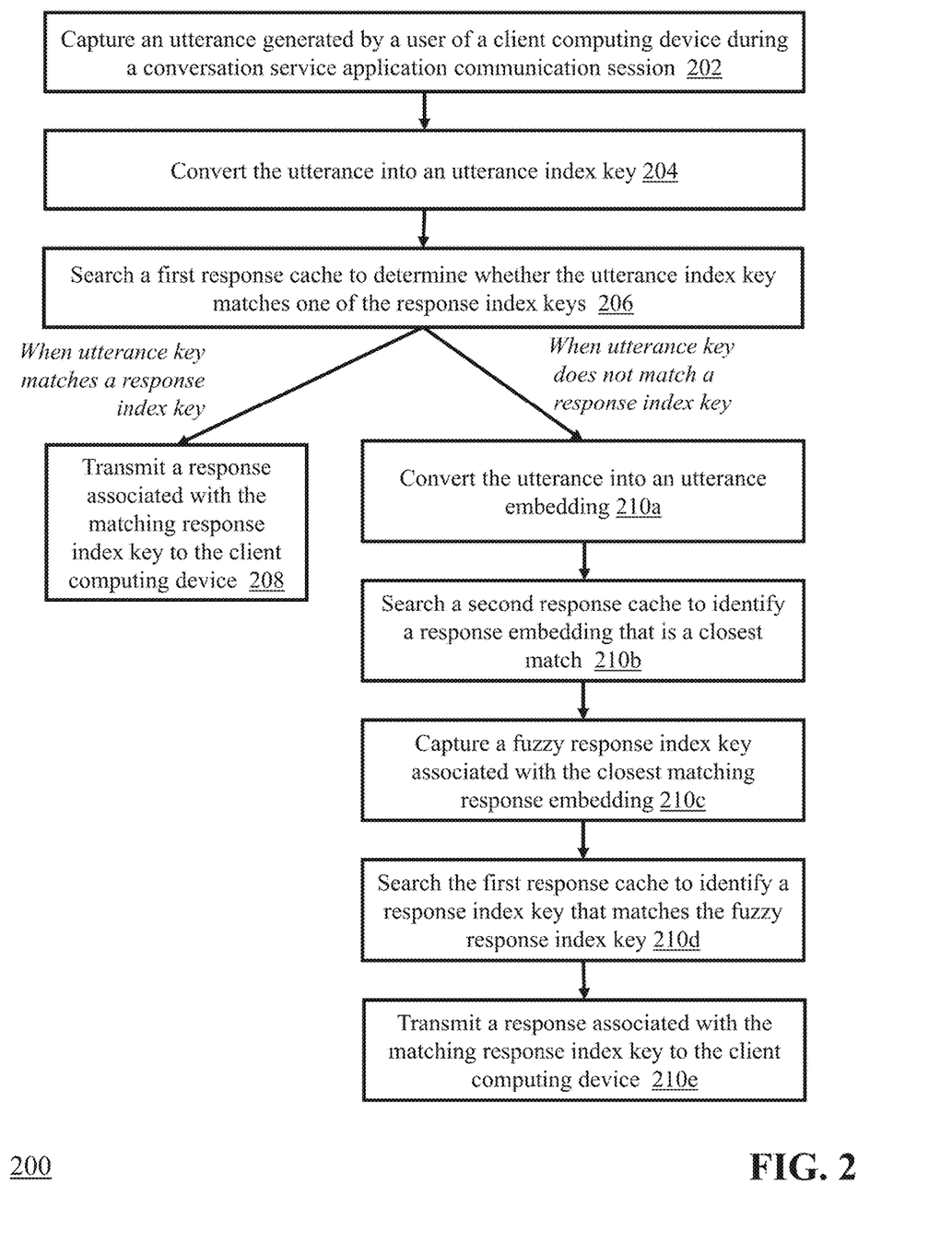
FIG. 2 is a flow diagram of a computerized method of efficient caching and retrieval of responses in conversation service application communication sessions.

FIG. 2 is a flow diagram of a computerized method 200 of efficient caching and retrieval of responses in conversation service application communication sessions, using system 100 of FIG. 1. A user at client computing device 102 can launch an application (e.g., app, browser) to perform a variety of tasks, including but not limited to information retrieval from local and/or remote data sources. For example, when the application is a browser application, the user can interact with the application to access one or more websites and/or webpages (either internally or externally hosted) in order to view information and submit queries for retrieval of additional information. In one embodiment, the user of client computing device 102 is a customer accessing a company website to retrieve information (e.g., product information, account information, customer service information, and the like).

As can be appreciated, in some instances the information that the customer is seeking may not be readily available or the customer may have additional questions that he or she cannot resolve using only the information provided by the browser application. In these instances, the customer may want to conduct a chat-based communication session with server computing device 106 via conversation service application 108. For example, a customer at client computing device 102 may want to connect to conversation service application 108 for real-time, automated assistance in resolving a problem, performing a transaction, or answering a question. The customer at device 102 can launch a function in the app and/or activate a link in a webpage displayed in the browser to initiate a network connection (e.g., HTTP) to conversation service application 108 on server computing device 106.

Server computing device 106 establishes a chat-based communication session with client computing device 102 via conversation service application 108. When the session is established, server computing device 106 can transmit one or more messages to client computing device 102 that greet the user and ask the user how conversation service application 108 can help. The user at client computing device 102 can submit one or more user messages (also called utterances) that relate to the user's reason or purpose for initiating the chat-based communication session (also called intent). Conversation service application 108 captures (step 202) an utterance generated by the user of client computing device 102 during the conversation service application communication session. In some embodiments, conversation service application 108 receives one or more data packets from client computing device 102 during the session that contain user utterances in either packet payload and/or metadata. Conversation service application 108 can extract the user utterances from the data packets as they arrive from client computing device 102 and store the utterances in local memory allocated to the chat session (e.g., session slot(s)).

As can be appreciated, a chat session represents a state-based conversation flow between client computing device 102 and conversation service application 108, where application 108 parses user utterances, determines user intent, and generates appropriate responses-including but not limited to carrying out one or more workflow actions relevant to the user utterances. In some embodiments, conversation service application 108 performs specific workflow actions (e.g., information retrieval, transaction processing) as necessary to generate the responses.

Figure 3:
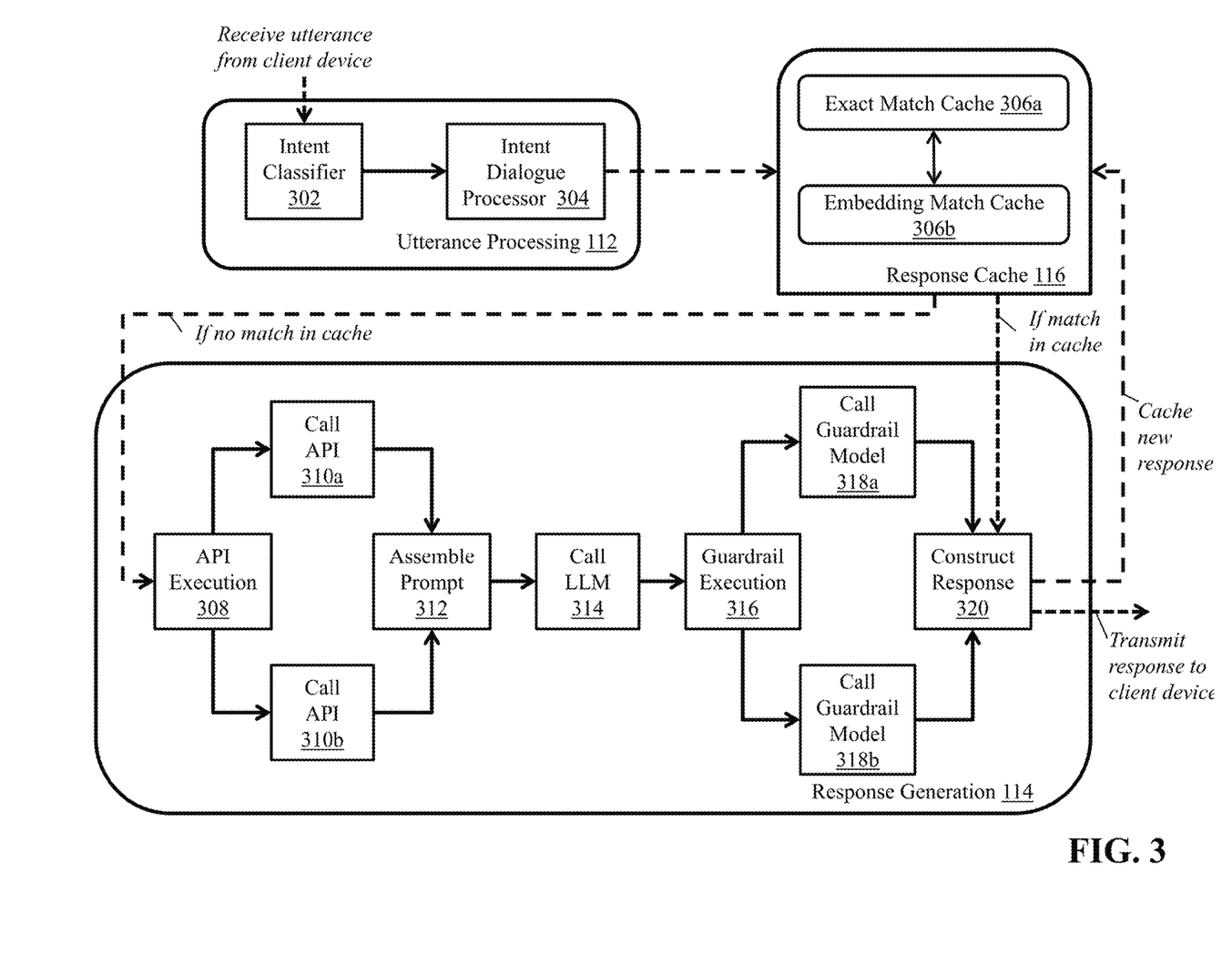
FIG. 3 is a detailed block diagram of a system for efficient caching and retrieval of responses in conversation service application communication sessions.

FIG. 3 is a detailed block diagram of the components 112, 114, 116 of server computing device 106. As shown in FIG. 3, utterance processing module 112 includes an intent classifier 302 and an intent dialogue processor 304. Intent classifier 302 of utterance processing module 112 receives the utterance generated by the user of client computing device 102. Classifier 302 analyzes the utterance to, e.g., identify or predict an intent of the user based upon the utterance. In some embodiments, intent classifier 302 comprises a specialized hardware and/or software module (e.g., firmware, middleware, etc.) which executes on one or more processors of server computing device 106 for the purpose of analyzing user utterances received from client computing device 102 during a communication session with conversation service application 108 and determining a user intent associated with the utterances using, e.g., a trained intent classification model. As can be appreciated, a main goal of conversation service applications is to parse incoming user messages, process the messages using NLP/NLU to understand the user's input, and to determine a user intent for the messages. Then, based upon the determined user intent, conversation service application 108 formulates a response to the user messages (e.g., provides information, answers a question, initiates a transaction, etc.) that satisfies the user intent and continues the conversation flow. In some embodiments, the intent classification model used by classifier 302 is a trained machine learning (ML) algorithm that receives a user message as input and generates a prediction of user intent associated with the user message based upon its training on historical user messages and known intents for those historical messages. In some embodiments, classifier 302 can leverage an external NLP/NLU framework such as Google® Dialogflow™, Amazon® Lex™, and Microsoft® Azure Bot™ For example, classifier 302 can provide domain-specific training data (e.g., user message samples and corresponding user intents) to one or more of these external NLP/NLU services for the purpose of training a customized intent classification model that is capable of predicting user intents for a given business context or application. The NLP/NLU services return the trained intent classification model to classifier 302, which deploys the classification model on server computing device 106 for processing of incoming user messages.

Once intent classifier 302 has generated a predicted intent for the incoming user utterance, intent dialogue processor 304 prepares the utterance for further analysis and generation of a corresponding response. Advantageously, intent dialog processor 304 can utilize response cache 116 as described herein to quickly identify and retrieve a response that is germane to the user utterance/intent, without having to invoke the full functionality of response generation module 114 to generate a new response unless it is necessary to do so.

Figure 4:
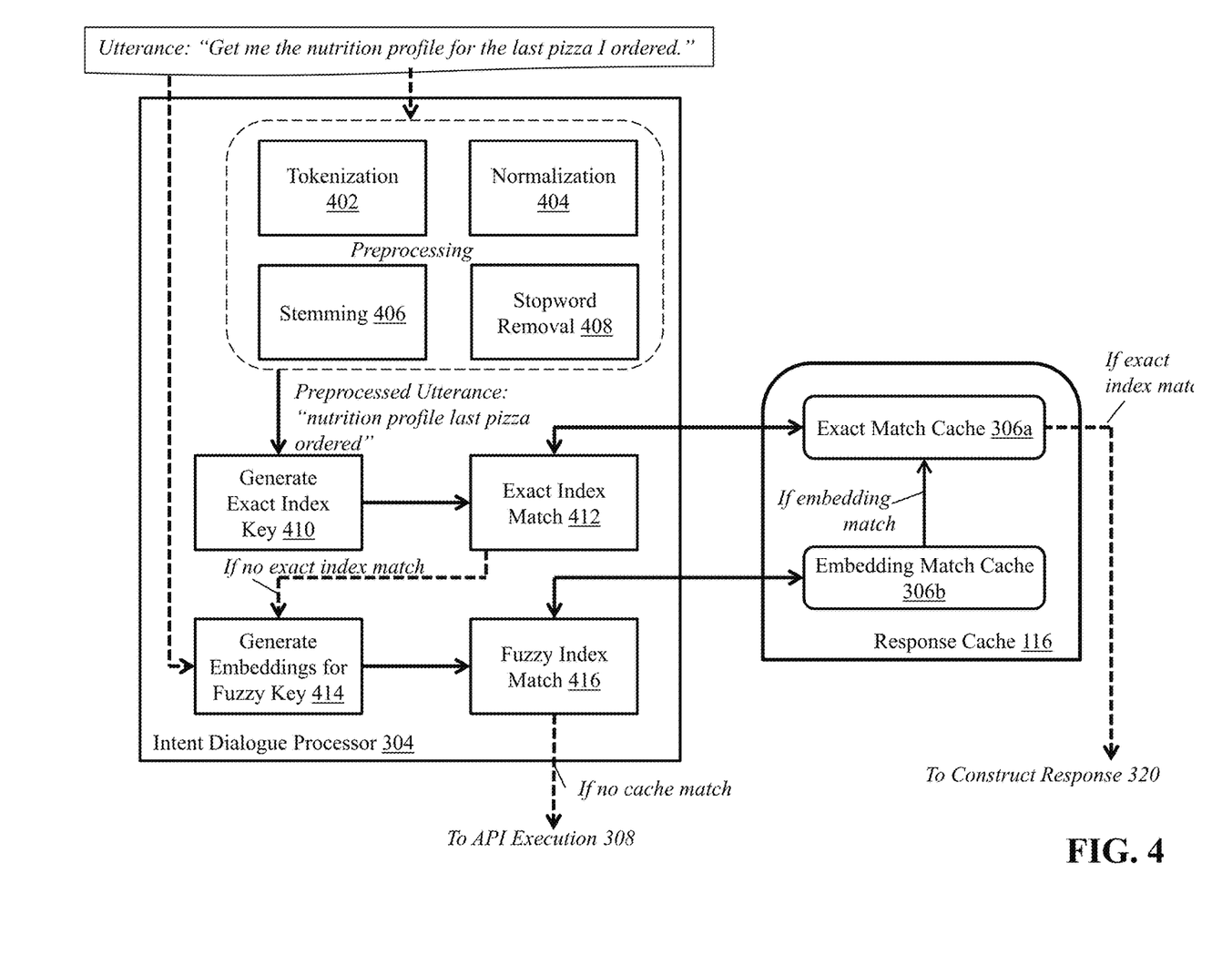
FIG. 4 is a detailed block diagram of an intent dialogue processor and a response cache of a server computing device.

FIG. 4 is a detailed block diagram of intent dialogue processor 304 and response cache 116 of server computing device 106. Intent dialog processor 304 converts (step 204) the utterance into an utterance index key. For example, the incoming utterance could be phrased as "Get me the nutrition profile for the last pizza I ordered." As shown in FIG. 4, intent dialogue processor 304 performs one or more preprocessing steps 402-408 on the user utterance before converting the utterance into an index key. For example, preprocessing can include tokenization (402), normalization (404), stemming (406), and/or stopword removal (408). It should be appreciated that these steps can be performed on the user utterance in any order without limiting the scope of the technology described herein. Tokenization relates to partitioning the utterance string into a plurality of tokens, where each token corresponds to a word in the utterance. Normalization relates to processing the words/tokens from each utterance (e.g., converting uppercase to lowercase, remove or keep accent marks, remove spaces, and the like), resulting in a uniform and consistent lexicon of words/tokens across utterances. Stemming relates to eliminating prefixes and/or suffixes from words to transform the words into their root form. Stopword removal relates to removing commonly appearing words (e.g., articles, prepositions, pronouns, etc.) that do not contribute to the meaning or context of the utterance. Intent dialogue processor 304 can be configured to perform other types of text preprocessing functions, such as lemmatization, punctuation removal, determining part-of-speech or syntax, and so forth. Exemplary preprocessing algorithms that can be used by intent dialogue processor 304 are described in C. Chai, "Comparison of text preprocessing methods," *Natural Language Engineering* (2023), 29, pp. 509-553, Cambridge University Press, Jun. 13, 2022, which is incorporated herein by reference. Using the above example, intent dialogue processor 304 preprocesses the incoming utterance of "Get me the nutrition profile for the last pizza I ordered" into the string "nutrition profile last pizza ordered."

Once the utterance has been preprocessed, intent dialogue processor 304 generates (410) an exact index key by converting the preprocessed utterance into an index key that uniquely represents the content/semantics of the preprocessed utterance. In a simplified example, processor 304 can convert the preprocessed utterance "nutrition profile last pizza ordered" into an index key of "nutrition_profile_last_pizza_ordered."

In another example, processor 304 can receive the following utterance: "What are the total Calories and Sugar contint in the desert I had, with coffee at the restaurant, two weeks ago on Friday night?" Note that the user has misspelled the words "content" and "dessert," and the user has also capitalized the words "Calories" and "Sugar." Processor 304 can preprocess the utterance using a rule-based tokenization algorithm that removes punctuation and performs whitespace tokenization, to produce the following matrix of tokens: ['What', 'are', 'the', 'total', 'Calories', 'and', 'Sugar', 'contint', 'in', 'the', 'desert', 'I', 'had', 'with', 'coffee', 'at', 'the', 'restaurant', 'two', 'weeks', 'ago', 'on', 'Friday', 'night']. Processor 304 can then apply a stopword removal algorithm on the matrix of tokens, e.g., using custom stopword list(s) and/or the spaCy NLP library (available at spacy.io), to produce the following matrix: ['total', 'Calories', 'Sugar', 'contint', 'desert', 'coffee', 'restaurant', 'two', 'weeks', 'ago', 'Friday', 'night'].

Processor 304 can then normalize the matrix of tokens to, e.g., correct capitalization and perform spell correction (e.g., using SymSpell, available at github.com/wolfgarbe/SymSpell, or pyspellchecker, available at pypi.org/project/pyspellchecker/), perform time normalization to identify and extract date-related entities in the input matrix (e.g., using spaCy NLP), and perform intent criteria and entity normalization (e.g., using spaCy NLP). In one example, the normalization process can modify the matrix of tokens as follows:
1) Case Normalization: ['total', 'calories', 'sugar', 'contint', 'desert', 'coffee', 'restaurant', 'two', 'weeks', 'ago', 'friday', 'night'];
2) Spell Correction: ['total', 'calories', 'sugar', 'content', 'dessert', 'coffee', 'restaurant', 'two', 'weeks', 'ago', 'friday', 'night'];
3) Time Normalization: ['total', 'calories', 'sugar', 'content', 'dessert', 'coffee', 'restaurant', 'time-Nov_15_2024_6_pm'];
4) Intent Criteria and Entity Normalization: ['intent-lookup_calories', 'criteria-total_sugar', 'entities-dessert_coffee', 'time-Nov_15_2024_6_pm'].

Processor 304 uses the normalized matrix to dynamically generate an index key. In some embodiments, processor 304 concatenates the tokens in the normalized matrix (each separated with a symbol, such as a colon) to generate the key-using the above example, the index key generated by processor is 'intent-lookup_calories: criteria-total_sugar: entites-dessert_coffee: time-Nov_15_2024_6_pm'.

Figure 5:
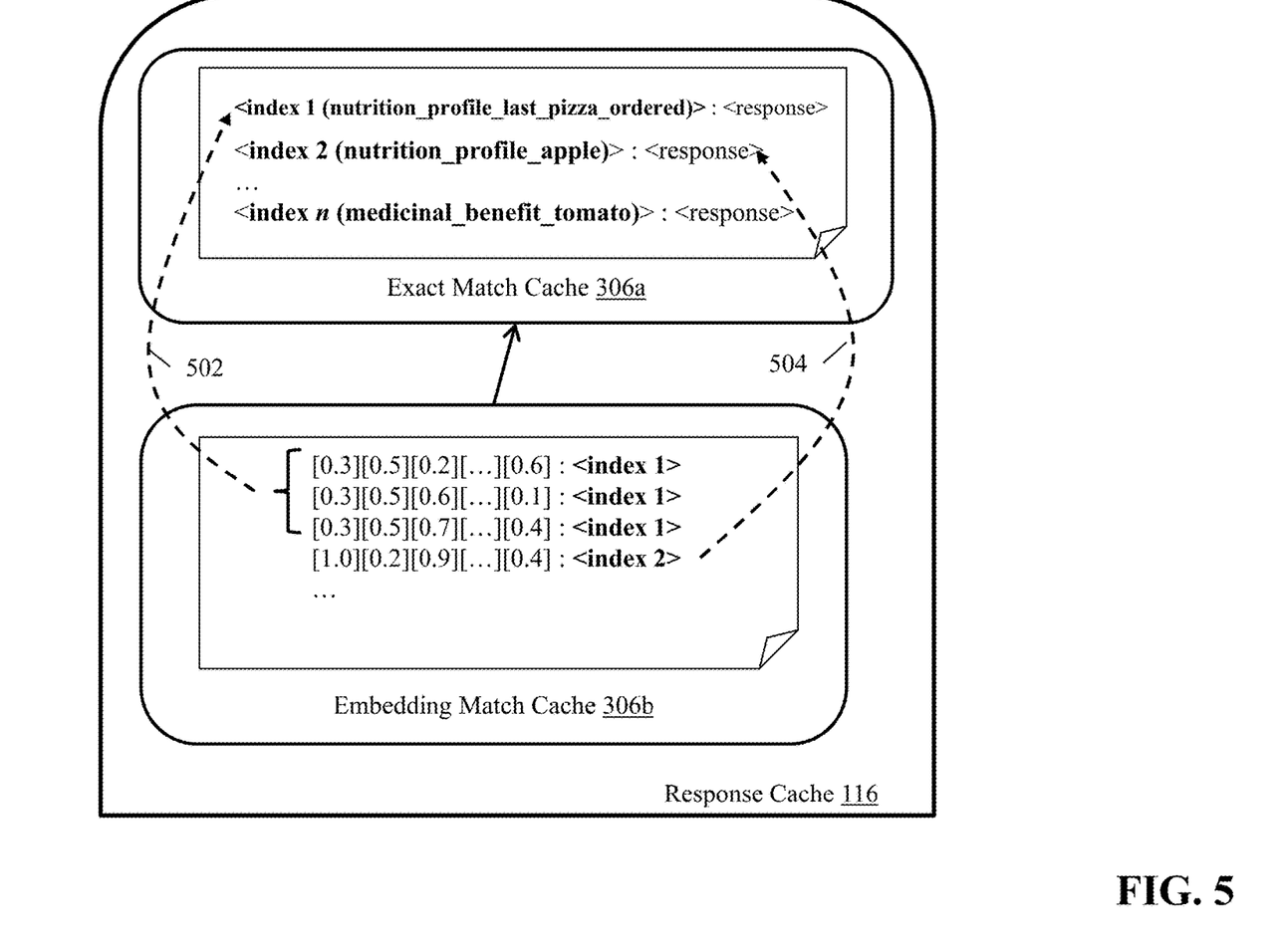
FIG. 5 is a detailed block diagram of the response cache of the server computing device.

Intent dialogue processor 304 then searches exact match cache 306*a* (step 206) to determine whether the utterance index key matches one of the index keys in cache 306*a*. Intent dialogue processor 304 connects to exact match cache 306*a* of response cache 116 and performs (412) an exact index match against data stored in cache 306*a* using the generated index key. FIG. 5 is a detailed block diagram of response cache 116 of server computing device 106. As shown in FIG. 5, exact match cache 306*a* comprises a plurality of data records each containing an index key (i.e., <index n>) mapped to a response value (i.e., <response>). In some embodiments, the data stored in the <response> field comprises a corpus of answer text, a link or pointer (e.g., URL, filesystem location) to a document that contains answer text, a response message, or a dialogue state value that, when applied to the current conversation session by processor 304, enables processor 304 to reconstruct a dialogue response. Using the above example, processor 304 compares the generated index key of "nutrition_profile_last_pizza_ordered" against data records stored in exact match cache 306*a* to determine whether the index key matches one of the index keys stored in cache 306*a*. In this case, intent dialogue processor 304 determines that the generated index key matches the stored index key of first data record <index 1>. In some embodiments, in order to qualify as a match, the generated index key must match the stored index key exactly. Typically, there will be only one index key stored in cache 306*a* that matches a generated index key. Turning back to FIG. 4, when processor 304 identifies an exact match in cache 306*a* to the generated index key, processor 304 retrieves the <response> value associated with the matching index key from cache 306*a* and transmits (step 208) the <response> value to response generation module 114.

In some cases, however, the index key generated by processor 304 from the preprocessed utterance may not be an exact match to any of the index keys stored in cache 306*a*. In these cases, intent dialogue processor 304 converts (step 210*a*) the incoming utterance into an utterance embedding. Processor 304 generates (414) an embedding for the incoming utterance (i.e., "Get me the nutrition profile for the last pizza I ordered") that can be used as a fuzzy key for identifying whether a matching response exists in response cache 116. Generally, the embedding is a multidimensional numeric representation (i.e., a vector) which encodes meaningful semantic information of the incoming utterance. In some embodiments, intent dialogue processor 304 is configured to generate the embedding using a pre-trained transformer network model that executes on server computing device 106. An exemplary model for generating the embedding is the SBERT network structure as described in N. Reimers and I. Gurevych, "Sentence-BERT: Sentence Embeddings using Siamese BERT-Networks," arXiv: 1908.10084v1 [cs.CL], Aug. 27, 2019, available at arxiv.org/pdf/1908.10084, which is incorporated herein by reference. Other types of embedding generation algorithms can be used within the scope of the technology described herein.

Once intent dialogue processor 304 has generated the embedding for the incoming utterance, processor 304 searches (step 210*b*) embedding index cache 306*b* to identify an embedding in the cache 306*b* that is a closest match to the generated embedding. Processor 304 performs (416) a fuzzy index match against data stored in embedding match cache 306*b* using the generated embedding. As shown in FIG. 5, embedding match cache 306*b* comprises a plurality of data records each containing an embedding value (i.e., [0.3] [0.5] [0.2] . . . [0.6]) mapped to an index key (i.e., <index n>), where each embedding value corresponds to a representation of a previously captured user utterance and the corresponding index key identifies the most relevant exact match index key (as stored in exact match cache 306*a*) to the utterance. Using the example above, during previous conversation sessions, the user at client device 102 may have submitted the following utterances: "Can you show the nutrition info for my most recent pizza order," "I'd like to see the pizza nutrition from my order last week," and "What are the nutrition details for an apple." As can be appreciated, the first two utterances are close to the utterance currently being processed by intent dialogue processor 304—while the third utterance is dissimilar. As shown in FIG. 5, multiple embeddings in cache 306*b* can be mapped to an exact match key in a many-to-one fashion.

To perform the fuzzy index match, intent dialogue processor 304 compares the embedding generated from the incoming utterance to the indexed embeddings in cache 306*b* to identify one of the indexed embeddings that is the closest match to the generated embedding. In some embodiments, processor 304 can compare the embeddings using a semantic closest match search, where a similarity measure (also called a distance measure) is calculated between the generated embedding and each indexed embedding stored in cache 306*b*. Processor 304 can then select the index key from cache 306*b* that is mapped to a stored embedding with the highest similarity measure to the generated embedding. In some embodiments, processor 304 can employ a K-nearest neighbor (KNN) algorithm to calculate the similarity measure. Other types of algorithms that can be used to calculate the similarity measure include, but are not limited to, cosine similarity and Euclidian distance.

In some embodiments, intent dialogue processor 304 can utilize a threshold value to filter the similarity measures calculated for the embedding comparison, where processor 304 eliminates stored embeddings with a similarity measure that falls below the threshold value. For example, the threshold value can be set to 0.90. After performing the fuzzy index search, processor 304 may determine that a small number of stored embeddings (e.g., one to five) have similarity measures that are above the threshold-meaning that these stored embeddings are the closest matches to the generated embedding. Processor 304 captures (step 210*c*) a response index key associated with the closest matching response embedding in cache 306*b*. Processor 304 can select the index key from cache 306*b* associated with the stored embedding that has the highest similarity value of the filtered results.

Upon determining a closest match index key from embedding index cache 306*b*, intent dialogue processor 304 searches (step 210*d*) exact match cache (i.e., cache 306*a*) using the closest match index key to identify an index key in cache 306*a* that matches the closest match index key. Processor 304 selects the data record in cache 306*a* that contains an index key that is the same as the closest match index key from cache 306*b*. Processor 304 retrieves the <response> value for the selected data record and transmits (step 210*e*) the <response> value to response generation module 114.

In another example, after performing the fuzzy index search, processor 304 may determine that no stored embeddings have similarity measures above the threshold. In this scenario, intent dialogue processor 304 transmits an indicator that no response match was found in the response cache 116 to response generation module 114, which executes functionality to generate a new response to the utterance for storage in cache 116 and transmission to the end user during the current conversation session. Turning back to FIG. 3, response generation module 114 receives the indicator from response cache 116 that no response match was found using either exact match against cache 306a or fuzzy match against cache 306b, as described above. API execution module 308 initiates the process for generating a new response to the utterance (e.g., "Give me the nutrition profile for the last pizza I ordered") by calling one or more APIs 310a, 310b to capture information to be used in creating an input prompt for a large language model (LLM) to generate a response. For example, API execution module 308 can call API 310a to, e.g., identify the last pizza order made by the user and the type of pizza ordered (e.g., size, restaurant name, etc.), and module 308 can call API 310b to, e.g., retrieve a list of ingredients in the identified pizza.

Assemble prompt module 312 synthesizes the information received from APIs 310a, 310b into a prompt to be used as input to a large language model (LLM). Module 312 can convert the data into a text prompt that requests the nutrition profile for the pizza based upon ingredients, size, source, etc. For example, if the user last ordered an Acme Corp. pepperoni pizza, APIs 310a, 310b can provide the relevant details to module 312, which creates a natural language text string—e.g., "Please create a nutrition profile for an Acme Corp. large pepperoni pizza."—that can be provided to a LLM via call LLM module 314 for generation of the corresponding nutrition profile. In some embodiments, assemble prompt module 312 is configured to augment a generated prompt with context information extracted from another data source (e.g., document repository, knowledge base). The context information can provide the LLM with additional guidance or understanding that is used by LLM when parsing the prompt and/or generating the response. In some embodiments, APIs 310a, 310b and/or assemble prompt module 312 can retrieve a digital document stored in database 120 that includes, e.g., regulations, policies, or other domain-specific information that the LLM should comply with or consider when analyzing the prompt and/or when generating the response. For example, the utterance may include a question regarding employee eligibility for a specific organization's retirement plan. Assemble prompt module 312 can extract relevant text from a retirement plan document maintained by the organization that includes an explanation of eligibility criteria and provide the extracted text to call LLM module 314 (along with the generated prompt) that enables the LLM to produce domain-specific output.

Call LLM module 314 transmits the generated prompt to an LLM that is either running locally on server computing device 106 or is running on a remote computing device coupled to server computing device 106. In some embodiments, call LLM module 314 transmits an API call to a cloud service that hosts the LLM. Exemplary LLMs that can be used with response generation module 114 include, but are not limited to, ChatGPT™ from OpenAI, Microsoft Copilot™ from Microsoft Corp., and Google Gemini™ from Google, Inc. Using the above example, the LLM can process the input prompt to generate a structured text response (e.g., JSON) and/or a natural language text response that contains nutrition profile data (e.g., calories, fat/cholesterol content, ingredients, serving size, etc.). LLM then transmits the response back to call LLM module 314.

Next, guardrail execution module 316 receives the LLM output from call LLM module 314 and initiates a process to validate the LLM output by calling one or more guardrail models 318a, 318b to analyze the LLM output and verify that the output conforms to one or more organizational rules or controls. For example, the guardrail models can analyze the LLM output to ensure that (i) the output is accurate (i.e., to detect hallucinated responses that may be generated by the LLM), (ii) the output is relevant to the input prompt (i.e., does not contain any off-topic or unrelated information), (iii) the output aligns with organizational standards relating to content-such as no inappropriate language; no discriminatory or harmful content; sufficient conformance to regulatory requirements; etc., and (iv) the output is grammatically correct. It should be appreciated that the above guardrail functions are merely exemplary, and that other types of output moderation and modification can be contemplated within the scope of the technology described herein. In some embodiments, the guardrail models can analyze the output and generate a modified version of the output based upon one or more the above functions, then provide the modified output to construct response module 320. It should be appreciated that, in some embodiments, the LLM used to generate the response can include one or more internal guardrails to validate the response prior to sending the response back to call LLM module 314.

Construct response module 320 receives the validated and/or modified output from guardrail models 318a, 318b and creates a response to the initial utterance received from client computing device 102. In some embodiments, module 320 converts the LLM output into a text format that is suitable for a response in the context of the conversation session. For example, module 320 can include one or more messages that surround or support the LLM output (e.g., "Here is the nutrition profile you requested . . . " and/or "Please let me know if you need further information on the nutrition profile . . . "). In another example, module 320 can arrange the output into a different format (e.g., using the text output to create a table that includes the nutrition profile). Construct response module 320 then transmits the response to client computing device 102 for display to the user during the chat session. Also, as shown in FIG. 3, module 320 also transmits the generated response to the response cache 116 for indexing and storage. For example, response cache 116 can convert the generated response into an index key and/or an embedding that are respectively stored in cache 116a and cache 116b. As a result, these responses are eligible to be matched against subsequent utterances received from client computing device 102 (as described above in the process of FIG. 4)—thereby eliminating the need to repeat the process of calling LLMs and guardrail models (thereby incurring additional processing time and computing resource requirements) to generate a completely new response.

As described above, virtual assistant applications 108 often rely on an orchestrator (e.g., a finite state machine) to control and manage multiple underlying components that perform data processing during a user dialogue flow. These orchestrators often integrate with various components like optimization models, LLMs 314, intent classifiers 302, guardrail models 318a, 318b, and other domain-specific knowledge APIs to capture user utterances, understand user intents, and generate or look up appropriate responses. However, these components may change over time—for example, an LLM may be retrained on additional documents or data in order to improve its accuracy and knowledge base. As a result, the responses stored in response cache 116 may become stale or inaccurate. To prevent the use of these outdated cached responses, the methods and systems described herein include the ability to index and store intermediate results (and associated metadata) generated by intent dialogue processor 302, call LLM module 314 and/or guardrail models 318a, 318b during creation of a response that is then cached in response cache 116. System 100 can then use the intermediate results and metadata to periodically invalidate any responses stored in response cache 116 that may have become outdated over time, due to changes in the underlying intent processors, LLMs, guardrail models, and/or other supporting APIs that were originally used by system 100 to generate the cached responses.

Using the response generation pipeline described above in FIG. 3, one or more components (e.g., 308, 310a, 310b, 312, 314, 316, 318a, 318b, 320) of response generation module 114 can be configured to transmit intermediate results and/or metadata to response cache 116 for indexing and storage. For example, call LLM module 314 can index and store the raw output generated by the LLM in response cache 116 along with relevant metadata identifying the particular LLM that generated the output (e.g., ID, version, model type, creation date, etc.). When subsequent changes to that LLM are detected, system 100 can identify responses stored in cache 116 that are associated with the LLM (using the above metadata) and invalidate/delete the identified responses from the cache 116.

System 100 includes cache cleaning module 118 that is configured to perform invalidation/deletion of responses stored in response cache 116. Exemplary functions of cache cleaning module 118 include:

Cache Invalidation—whenever a model or API change is detected, cache cleaning module 118 can trigger a cache invalidation process. Module 118 can identify cache entries where the associated identifying metadata indicates usage of the underlying model or API for processing the utterance(s) and/or generating the response(s). Module 118 can then delete the entries from cache 116.

Related Component Tracking—module 118 can support both a push-based and pull-based framework to track changes to underlying components. In a push-based system, cache cleaning module 118 is configured to interface with a REST API endpoint. When the endpoint is called, module 118 receives a message to initiate cache invalidation based upon the changes identified in the message. In a pull-based system, cache cleaning module 118 is coupled to a central registry or service which monitors for changes to the underlying components and tracks the changes in a repository. Then, module 118 can periodically poll the central registry for updates/changes and when such updates are detected, module 118 initiates the cache invalidation procedure.

Figure 6:
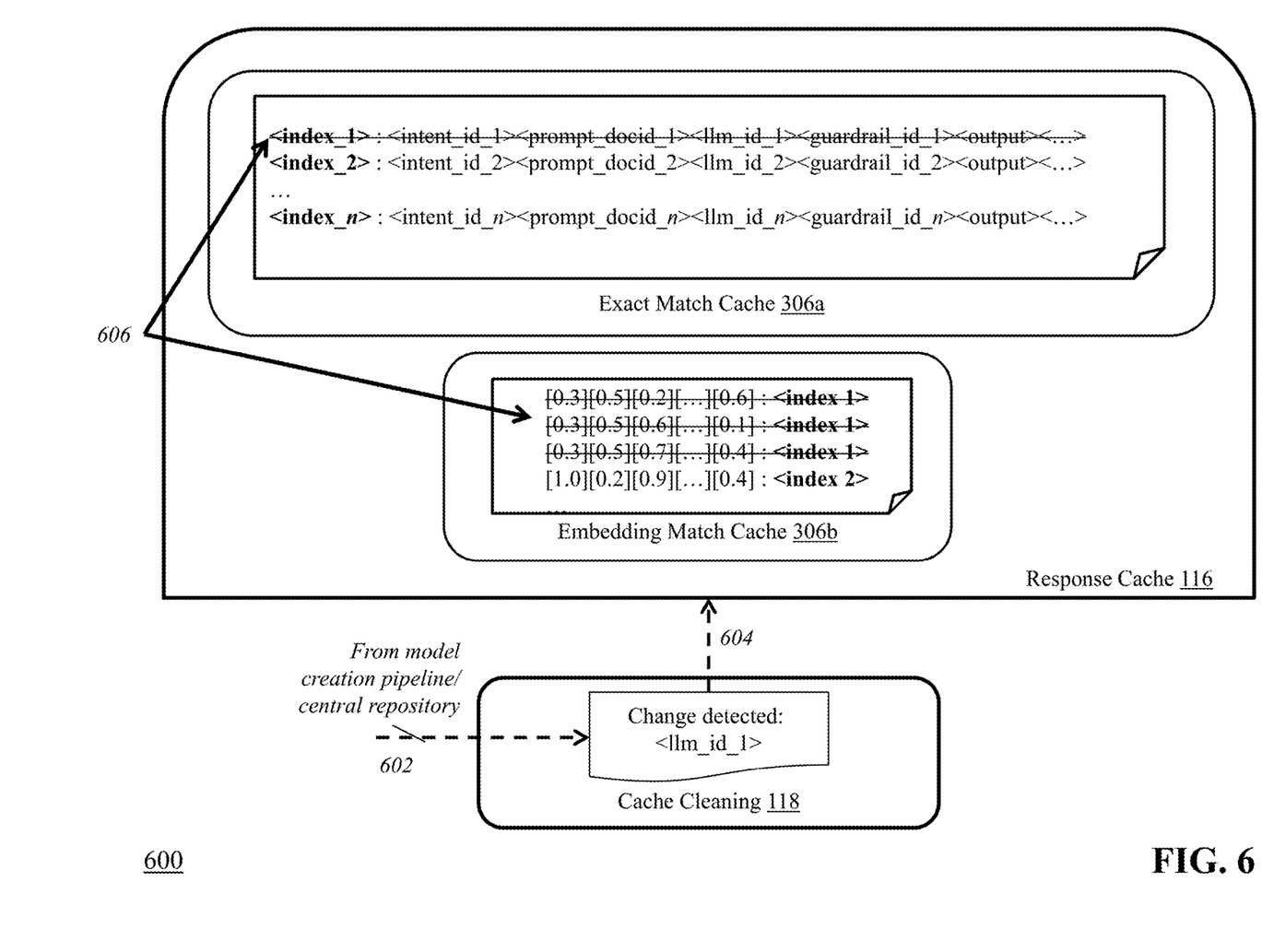
FIG. 6 is a workflow diagram of a cache entry invalidation process performed by a cache cleaning module of the server computing device.

FIG. 6 is a workflow diagram of a cache entry invalidation process 600 performed by cache cleaning module 118 of server computing device 106. As shown in FIG. 6, cache cleaning module 118 receives indicia from, e.g., a model creation pipeline (in the example of a push-based system) or a central repository (in the example of a pull-based system) that one or more underlying components of utterance processing module 112 and/or response generation module 116 have changed. For example, a specific LLM may have been retrained or upgraded to a new version and cache cleaning module 118 receives (602) a message that the LLM has changed. In some embodiments, the message includes an ID for the LLM (e.g., <llm_id_1>), a new version number for the LLM, and a date/time of when the change was made. In some embodiments, the LLM ID is a unique key that identifies the specific model/version for the LLM, in order to distinguish between different versions of the same LLM type. Upon receiving the message, module 118 triggers the cache invalidation process to identify and delete cache entries that are associated with the LLM ID.

Cache cleaning module 118 connects to response cache 116 and identifies (604) one or more entries in exact match cache 306a that are associated with the LLM ID. In the example of FIG. 6, module 118 identifies the cache entry <index_1> because this entry is associated with <llm_id_1>. In some embodiments, after identifying cache entry <index_1> from exact match cache 306a, module 118 searches embedding match cache 306b for any entries that are associated with <index_1> to ensure that those entries are also identified. After identifying relevant cache entries as described above, cache cleaning module 118 deletes (606) the identified entries from exact match cache 306a and/or embedding match cache 306b. In FIG. 6, the deleted entries are shown in strikethrough text. In some embodiments, module 118 does not delete the embedding entries in cache 306b altogether; instead, module 118 can remove the association between the identified embeddings and <index_1>, then rebuild the cached entries to be associated with a different index value for a response that is still valid in cache 306a (e.g., the next most relevant response).

The technical advantages of the cache cleaning process described above include:

Keeping Knowledge Bases Accurate: this process ensures virtual assistant applications that depend on a cached Q&A model or document repository to answer real-time queries (e.g., weather forecasts) can efficiently invalidate and clear knowledge from the underlying Q&A model or repository when changes occur;

Keeping Up with Model Evolutions: As models such as LLMs are continuously improved, the cache invalidation technique guarantees that dialogue processing systems utilizing the models can leverage the latest model capabilities by clearing the cache whenever a new model version is deployed; and Guardrail Consistency: the cache cleaning process is useful in dialogue processing systems that include guardrail components to ensure that existing and/or newly-generated responses comply with guardrail models after such guardrails are updated or changed.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for efficient caching and retrieval of responses in conversation service application communication sessions, the system comprising a server computing device having a memory that stores computer-executable instructions and a processor that executes the computer-executable instructions to:

capture an utterance generated by a user of a client computing device during a conversation service application communication session between the server computing device and the client computing device;
convert the utterance into an utterance index key;
search a first response cache comprising a plurality of response index keys to determine whether the utterance index key matches one of the response index keys;
when the utterance index key matches one of the response index keys in the first response cache:
transmit a response associated with the response index key that matches the utterance index key from the first response cache to the client computing device;
when the utterance index key does not match any of the response index keys in the first response cache:
convert the utterance into an utterance embedding;
search a second response cache comprising a plurality of response embeddings to identify one of the response embeddings that is a closest match to the utterance embedding;
capture a fuzzy response index key associated with the closest matching response embedding in the second response cache;
search the first response cache to identify a response index key that matches the fuzzy response index key; and
transmit a response associated with the response index key that matches the fuzzy response index key from the first response cache to the client computing device.

2. The system of claim 1, wherein converting the utterance into an utterance index key comprises processing the utterance using one or more text pre-processing algorithms.

3. The system of claim 2, wherein the one or more text pre-processing algorithms include a tokenization algorithm, a normalization algorithm, a stopword removal algorithm, and a stemming algorithm.

4. The system of claim 1, wherein the utterance embedding comprises a multidimensional vector of numeric values representing features of the utterance.

5. The system of claim 4, wherein the server computing device compares the utterance embedding to the plurality of response embeddings in the second response cache using a semantic similarity algorithm to identify one of the response embeddings that is the closest match to the utterance embedding.

6. The system of claim 5, wherein the semantic similarity algorithm comprises a k-nearest neighbor algorithm.

7. The system of claim 1, wherein when the fuzzy response index key does not match any of the response index keys in the first response cache, the server computing device:
creates an input prompt based upon the utterance;
transmits the input prompt to a large language model (LLM) for generation of a new response to the utterance;
stores the new response in the second response cache in association with the fuzzy response index key; and
transmits the new response to the client computing device.

8. The system of claim 1, wherein the server computing device periodically refreshes at least one of the first response cache and the second response cache.

9. The system of claim 8, wherein periodically refreshing at least one of the first response cache and the second response cache comprises:

determining that one or more response generation models used to generate responses stored in the first response cache or the second response cache have changed;
identifying, in the first response cache or the second response cache, one or more responses generated using the changed response generation models based upon metadata associated with the responses; and
removing the identified responses from the first response cache or the second response cache.

10. The system of claim 9, wherein the metadata associated with the responses comprises a model identifier associated with each of the responses.

11. The system of claim 9, wherein determining one or more response generation models have changed comprises determining that the one or more response generation models is out of date or determining that a version number of the one or more response generation models has changed.

12. The system of claim 8, wherein periodically refreshing at least one of the first response cache and the second response cache comprises:
determining that one or more documents used to train one or more response generation models associated with responses stored in the first response cache or the second response cache have changed;
identifying, in the first response cache or the second response cache, one or more responses associated with the response generation models trained using changed documents based upon metadata associated with the changed documents; and
removing the identified responses from the first response cache or the second response cache.

13. The system of claim 11, wherein the one or more response generation models include a large language model, a question-and-answer-model, or a guardrail model.

14. A computerized method of efficient caching and retrieval of responses in conversation service application communication sessions, the method comprising:
capturing, by a server computing device, an utterance generated by a user of a client computing device during a conversation service application communication session between the server computing device and the client computing device;
converting, by the server computing device, the utterance into an utterance index key;
searching, by the server computing device, a first response cache comprising a plurality of response index keys to determine whether the utterance index key matches one of the response index keys;
when the utterance index key matches one of the response index keys in the first response cache:
transmitting, by the server computing device, a response associated with the response index key that matches the utterance index key from the first response cache to the client computing device;
when the utterance index key does not match any of the response index keys in the first response cache:
converting, by the server computing device, the utterance into an utterance embedding;
searching, by the server computing device, a second response cache comprising a plurality of response embeddings to identify one of the response embeddings that is a closest match to the utterance embedding;
capturing, by the server computing device, a fuzzy response index key associated with the closest matching response embedding in the second response cache;

searching, by the server computing device, the first response cache to identify a response index key that matches the fuzzy response index key; and transmitting, by the server computing device, a response associated with the response index key that matches the fuzzy response index key from the first response cache to the client computing device.

15. The method of claim 14, wherein converting the utterance into an utterance index key comprises processing the utterance using one or more text pre-processing algorithms.

16. The method of claim 15, wherein the one or more text pre-processing algorithms include a tokenization algorithm, a normalization algorithm, a stopword removal algorithm, and a stemming algorithm.

17. The method of claim 14, wherein the utterance embedding comprises a multidimensional vector of numeric values representing features of the utterance.

18. The method of claim 17, further comprising comparing, by the server computing device, the utterance embedding to the plurality of response embeddings in the second response cache using a semantic similarity algorithm to identify one of the response embeddings that is the closest match to the utterance embedding.

19. The method of claim 18, wherein the semantic similarity algorithm comprises a k-nearest neighbor algorithm.

20. The method of claim 14, wherein when the fuzzy response index key does not match any of the response index keys in the first response cache, the method further comprises:

creating, by the server computing device, an input prompt based upon the utterance;

transmitting, by the server computing device, the input prompt to a large language model (LLM) for generation of a new response to the utterance;

storing, by the server computing device, the new response in the second response cache in association with the fuzzy response index key; and transmitting, by the server computing device, the new response to the client computing device.

21. The method of claim 14, further comprising periodically refreshing, by the server computing device, at least one of the first response cache and the second response cache.

22. The method of claim 21, wherein periodically refreshing at least one of the first response cache and the second response cache comprises:

determining that one or more response generation models used to generate responses stored in the first response cache or the second response cache have changed;

identifying, in the first response cache or the second response cache, one or more responses generated using the changed response generation models based upon metadata associated with the responses; and removing the identified responses from the first response cache or the second response cache.

23. The method of claim 22, wherein the metadata associated with the responses comprises a model identifier associated with each of the responses.

24. The method of claim 22, wherein determining one or more response generation models have changed comprises determining that the one or more response generation models is out of date or determining that a version number of the one or more response generation models has changed.

25. The method of claim 21, wherein periodically refreshing at least one of the first response cache and the second response cache comprises:

determining that one or more documents used to train one or more response generation models associated with responses stored in the first response cache or the second response cache have changed;

identifying, in the first response cache or the second response cache, one or more responses associated with the response generation models trained using changed documents based upon metadata associated with the changed documents; and removing the identified responses from the first response cache or the second response cache.

26. The method of claim 25, wherein the one or more response generation models include a large language model, a question-and-answer-model, or a guardrail model.

* * * * *